April 30, 1957 F. HAUSER 2,790,349
FILM GATE

Filed April 23, 1953 2 Sheets-Sheet 1

INVENTOR
F. HAUSER
BY
ATTORNEY

April 30, 1957
F. HAUSER
2,790,349
FILM GATE
Filed April 23, 1953
2 Sheets-Sheet 2
FIG. 5
FIG. 2
FIG. 3
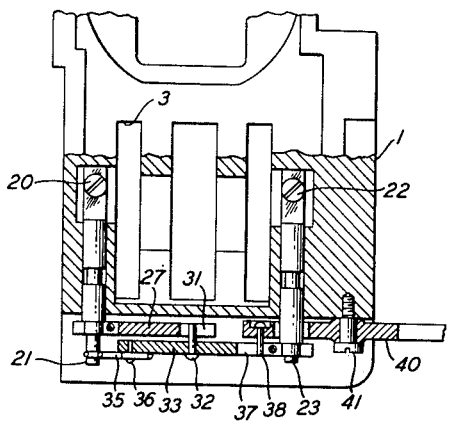
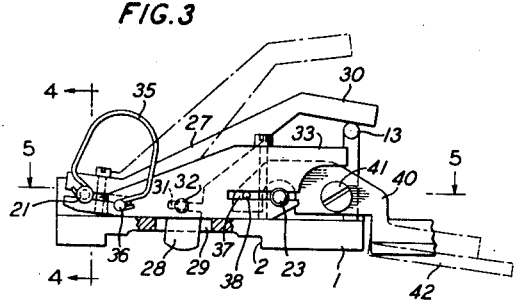
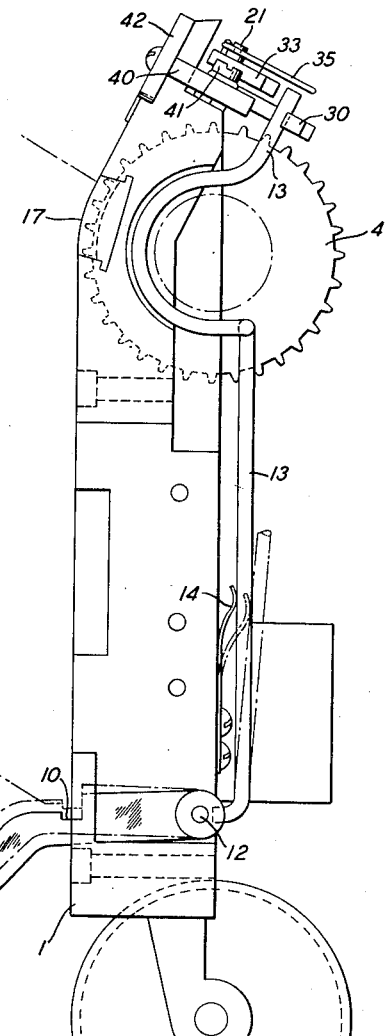
FIG. 4
FIG. 6
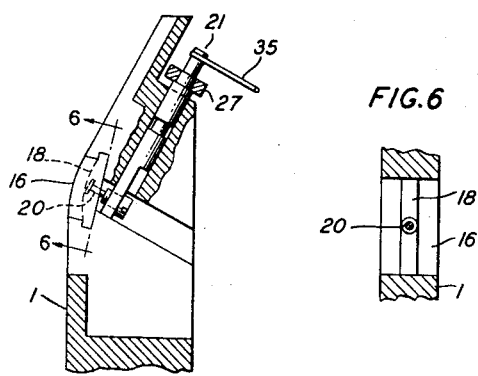
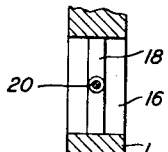
INVENTOR
F. HAUSER
BY
J. F. McEneany
ATTORNEY United States Patent Office 2,790,349
Patented Apr. 30, 1957

2,790,349

FILM GATE

Frederick Hauser, Los Angeles, Calif., assignor, by mesne assignments, to Westrex Corporation, a corporation of Delaware Application April 23, 1953, Serial No. 350,699

3 Claims. (Cl. 88—17)

This invention relates to film guiding apparatus and particularly to improvements in film gates for maintaining a film in a defined path at the point of translation of the image recorded on the film.

The invention is directed particularly to a film plate and cooperating gate for guiding a sound or picture film past the point of sound or picture reproduction in a film editing apparatus. In a film editing apparatus wherein a sound film is transported past a sound reproducing station and a separate picture film is transported past a picture reproducing station, it is often desirable at some time during the synchronous reproduction of the sound and the picture, to arrest the forward motion of both films for the purpose of marking either one or both the sound and picture films at the point then located at the reproducing station. To mark either film at its reproducing station it is necessary to move the usual film gate out of contact with the film on the plate. Unless extreme care is exercised, the film sprocket perforations will disengage from the teeth of the driving sprocket and is thus likely to result in the loss of the existing synchronism between sound and picture. As relative longitudinal movement of either one of the films in either direction through a length equal to the distance between two sprocket perforations can result in an undesirable loss of synchronism between reproduced sound and projected picture image, it is highly important in a film editing procedure that the sound and picture films be retained in their engaged position with their driving sprockets when the film gate is removed from contact with their films to permit marking thereof.

It is the object of this invention to provide a film guide comprising a film plate and cooperating film gate incorporating means for retaining a film in fixed position on the film plate when the film gate is moved to non-film engaging position.

A feature of the invention resides in the provision of means laterally slidable in the film plate to overhang the marginal edges of the film on the sprocket to prevent disengagement of the film and sprocket teeth. The slidable film retaining means is made operable through a mechanical linkage including a depressible lever extending upwardly through the film plate in the path of the film beyond its point of engagement with the sprocket.

A further feature of the invention resides in the provision of means operable to move the film retaining members to non-film retaining position in combination with a mechanical connection between said means and the normal locking means for the film gate, whereby operation of a single control produces simultaneously the release of the film retaining members and the opening of the film gate.

The invention will be clearly understood from the following description of the accompanying drawings in which:

Fig. 2 is a side elevation of the film plate shown in Fig. 1;

Fig. 3 is a top view of the film plate showing details of the mechanical linkage included in the means operating the film retaining means in accordance with the invention;

Fig. 4 is a section taken through line 4—4 of Fig. 3;

Fig. 5 is a section taken along line 5—5 of Fig. 3; and

Fig. 6 is a section taken along line 6—6 of Fig. 4.

Figure 1:
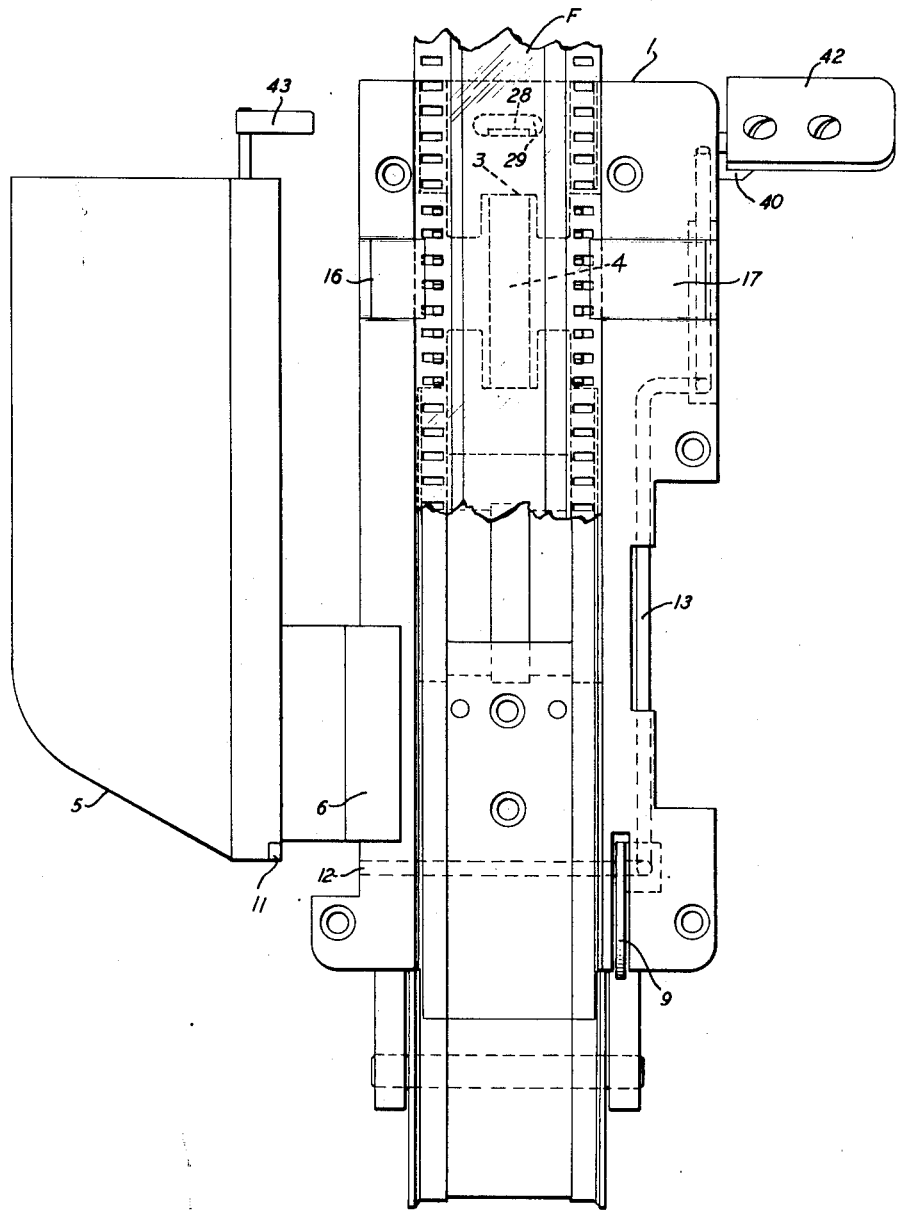
Fig. 1 is a front view of a film plate nad cooperating film gate in accordance with the invention.

Referring to Fig. 1, numeral 1 designates a film plate provided with a channel 2 adapted to receive a film F. An aperture 3 in plate 1 provides an opening to receive the sprocket teeth of a sprocket 4 in engagement with the film F in the channel 2. A gate 5 is pivoted at 6 on plate 1. When the gate 5 is turned on its pivot to the right, it engages the marginal edges of the film located in channel 2. Gate 5 is secured in its film engaging position by a latch 9 which is provided with a notch 10 to receive projection 11 on gate 5. The securing latch 9 is secured to a shaft 12 which is rotatably mounted in plate 1. An integral extension 13 of shaft 12 is urged to the position as shown in the dotted line by means of a spring 14, mounted on the underside of plate 1. The shaft 12 and, therefore, the latching means 9 is urged by spring 14 to the position shown by the dotted line so that when gate 5 is closed it will be automatically secured in closed position. Gate 5 may be released and returned to its open position by manual movement of latch 9.

At the point in the channel that film F is engaged by the sprocket teeth, there is provided a pair of film retaining members 16 and 17 which are slidably mounted in plate 1. These film retaining members are slidable inwardly to overhang the marginal edges of the film F which are in engagement with the sprocket shoulders as shown in Fig. 1.

Referring now to Figs. 4 and 5, each of the film retaining members 16 and 17 are provided with grooves as shown at 18. A rockable pin 20 extends into the groove 18. The pin 20 is securely mounted in a rotatable shaft 21 which is mounted for rotation in plate 1. A similar pin 22 and shaft 23 is provided as shown in Fig. 5 for moving film retaining member 17.

These film retaining members 16 and 17 are moved in unison inwardly to film retaining position by means of a mechanical linkage shown in detail in Fig. 3. One element 27 of the mechanical linkage is secured to shaft 21. This element 27 is provided with an extension 28 which extends through an aperture 29 in plate 1. Element 27 is also provided with extension 30 which, when in the position shown in the full line in Fig. 3, engages and produces movement of integral extension 13 in a direction to produce rotation of shaft 12 against the action of spring 14 as shown clearly in Fig. 2. The resulting movement of shaft 12 produces backward motion of latch 9 to release gate 5. Linkage element 27 is provided with a slot 31 in which a pin 32 is slidably mounted. Pin 32 is fixed in a second linkage element 33 which is secured to shaft 23. An over-center spring 35 has one end anchored on shaft 21 and the other end anchored on a pin 36, secured in linkage element 33.

A slot 37 in element 33 receives a pin 38 which is secured to a third member 40 of the mechanical linkage. This member 40 is pivoted at 41 to the plate 1.

With the gate 5 open, as shown in Fig. 1, the film F is placed in channel 2 in plate 1 and threaded over sprocket 4. The extension 28 of linkage element 27 is then depressed, thus producing inward motion of film retaining elements 16 and 17 to a position at which they overhang the marginal edges of the film on the sprocket. When the extension 28 of element 27 is depressed, it is moved out of the film path and will not, therefore, interfere with free movement of the film in the guide channel. The element 27 with its extension 28 is maintained in the depressed or operated position by means of the off-center spring 35.

Depression of extension 28 produces rotation of shaft 21 by reason of its connection to linkage element 27. Simultaneously, shaft 23 will be rotated by reason of its connection to linkage element 33, which receives its motion by reason of its connection to linkage member 27 through pin 32.

Simultaneously, with the movement of extension 28, the linkage member 40 is rotated about its pivot 41 by reason of its connection with linkage element 33 through pin 38. The spring 35 is effective to hold the linkage elements and, therefore, the film retaining elements 16 and 17 in their film retaining position.

If, with the film retaining elements in film retaining position, it becomes desirable to move gate 5 to its open position so that the film may be appropriately marked, the latch 9 may be manually operated to release gate 5. While the integral extension 13 to shaft 12 will be moved upwardly, its movement will not disturb the operating linkage assembly for the shafts 21 and 23.

If, when projection of the film is complete or for any other reason, it is desirable to remove the film F from the film gate, the latching means 9 for gate 5 and the operating linkage mechanism for shafts 21 and 23 may be simultaneously operated by downward pressure on member element 42, secured to linkage member 40. It can be readily seen from the drawings that downward movement of linkage element 40 will produce movement of linkage elements 33 and 27 and the shafts 23 and 21 to the position shown in Fig. 3 to thus move the film retaining elements 16 and 17 to non-film engaging position. The extension 30 of linkage element 27, in the position shown in solid lines of Fig. 3, forces extension 13 of shaft 12 in a direction to oppose the force of spring 14 to thus rotate shaft 12 and latch 9 to non-latching position.

A depressible pivoted arm 43 is mounted on gate 5. Downward movement of the arm 43 into engagement with member 42 will, therefore, produce the simultaneous release of gate 5 and movement of elements 16 and 17 to non-film engaging position.

The film gate in accordance with this invention, while particularly applicable to a film editing apparatus, may also be used with advantage in other types of film gates wherein it is desired to retain the film in its position on the film guide when the cooperating film gate is moved out of engagement with the film.

What is claimed is:

1. A film gate structure comprising a plate provided with a film guiding channel and an aperture adapted to receive a sprocket in engagement with a film in said channel, means for retaining said film on said sprocket, said film retaining means comprising a pair of elements each of which is slidably mounted in said plate on opposite sides of the channel portion thereof at the area of engagement between said film and said sprocket, means operable to simultaneously move said retaining elements inwardly to film retaining position, said last-mentioned means including a mechanical linkage, a first element of said linkage having a projection thereon which extends through an aperture in said plate into the channel area thereof in the path of said film, said first linkage element being manually operable downwardly out of the film path to produce movement of said film retaining elements to film retaining position, and a second element of said linkage having a projection extending outwardly from said plate and manually operable to produce reverse movement of said first linkage member to effect movement of said film retaining elements to non-film retaining position.

2. The combination in a film guiding unit comprising a film plate and a cooperating film gate mounted for movement into engagement with a film on said plate, means for locking said gate in film engaging position with said plate, a film driving sprocket extending through an aperture in said plate in engagement with a film thereon, means for retaining said film on said sprocket, said film retaining means comprising a pair of elements each of which is slidably mounted in said plate on opposite sides of the area of engagement between said film and said sprocket, means operable to simultaneously move said retaining elements inwardly to film retaining position, said last-mentioned means including a mechanical linkage, a first element of said mechanical linkage being manually movable to produce movement of said retaining elements to film retaining position, a second element of said mechanical linkage being manually operable to reverse the movement of said first element of said linkage whereby said film retaining elements are moved to non-film engaging position, and means operable by reverse movement of said first element of said mechanical linkage to release said gate locking means.

3. A film gate structure comprising a film plate and a cooperating film gate mounted for movement into engagement with a film on said plate, said film plate being provided with a film guiding channel and an aperture to receive the sprocket in engagement with a film disposed in the channel in said plate, a pair of film retaining elements slidably mounted in said plate on opposite sides thereof in the area of engagement of said film with said sprocket, means comprising a mechanical linkage and a pair of rotatable shaft elements each operative to produce movement of one of said film retaining elements, a first element of said mechanical linkage secured to one of said rotatable shaft elements, a second element of said mechanical linkage secured to the other of said rotatable shaft elements, means interconnecting said first and second elements of said mechanical linkage whereby movement of one of said linkage elements produces movement of the other of said linkage elements, means for latching said gate in film engaging position with said plate, said latching means including an element operable upon movement thereof to release said latching means, said latch element extending into the path of movement of one of said linkage members to be moved thereby to latch releasing position upon movement of said linkage element in a direction to produce movement of said film retaining elements to non-film engaging position.

References Cited in the file of this patent
UNITED STATES PATENTS

| 1,298,393 | Proctor | Mar. 25, 1919 |
| 2,051,789 | Foster et al. | Aug. 18, 1936 |
| 2,438,710 | Larson | Mar. 30, 1948 |

FOREIGN PATENTS

| 477,649 | Great Britain | Jan. 4, 1938 |